(12) United States Patent
Hur et al.

(10) Patent No.: US 11,376,923 B2
(45) Date of Patent: Jul. 5, 2022

(54) AIR CONDITIONER FOR VEHICLE

(71) Applicant: Hanon Systems, Daejeon (KR)

(72) Inventors: Heon Hur, Daejeon (KR); Jae Woo Ko, Daejeon (KR); Young Keun Kim, Daejeon (KR); Jong Min Lee, Daejeon (KR); Gyu Ik Han, Daejeon (KR)

(73) Assignee: Hanon Systems, Daejeon (KR)

( * ) Notice: Subject to any disclaimer, the term of this patent is extended or adjusted under 35 U.S.C. 154(b) by 392 days.

(21) Appl. No.: 16/661,440

(22) Filed: Oct. 23, 2019

(65) Prior Publication Data
US 2020/0130459 A1   Apr. 30, 2020

(30) Foreign Application Priority Data
Oct. 24, 2018 (KR) .................. 10-2018-0127109

(51) Int. Cl.
B60H 1/00 (2006.01)

(52) U.S. Cl.
CPC ..... B60H 1/00692 (2013.01); B60H 1/00521 (2013.01); B60H 1/00564 (2013.01); B60H 2001/007 (2013.01)

(58) Field of Classification Search
CPC ............ B60H 1/00692; B60H 1/00521; B60H 1/00564; B60H 2001/007; B60H 1/00542; B60H 1/00528

USPC ......................................................... 454/456
See application file for complete search history.

(56) References Cited

U.S. PATENT DOCUMENTS

| | | | |
|---|---|---|---|
| 2006/0130406 A1* | 6/2006 | Yoshida | B60H 1/00692 49/352 |
| 2015/0038067 A1* | 2/2015 | Byon | B60H 1/00692 454/261 |
| 2018/0162192 A1* | 6/2018 | Lee | B60H 1/00692 |

* cited by examiner

*Primary Examiner* — Avinash A Savani
*Assistant Examiner* — Ryan L Faulkner
(74) *Attorney, Agent, or Firm* — Norton Rose Fulbright US LLP; James R. Crawford (57) ABSTRACT

Disclosed is an air conditioner for a vehicle, which makes it possible for an upper case and a lower case to be assembled in correct position without minute misassembly between the upper case and the lower case, thereby making operation of a sliding door smooth. The air conditioner, which includes an air-conditioning case having a plurality of cases and a door disposed inside the air-conditioning case to be able to slide, further includes: a shape-matching part where the plurality of cases are matched each other in shape; and a guide part crossing the shape-matching part to guide a sliding action of the door, wherein a cross section of the guide part at the shape-matching part is formed to be eccentric.

10 Claims, 10 Drawing Sheets

FIG. 1

PRIOR ART

FIG. 2

PRIOR ART

FIG. 3

PRIOR ART

AIR CONDITIONER FOR VEHICLE

This application claims priority from Korean Patent Application No. 10-2018-0127109 filed on Oct. 24, 2018. The entire contents of these applications are incorporated herein by reference in their entirety.

BACKGROUND OF THE INVENTION

Field of the Invention

The present invention relates to an air conditioner for a vehicle, and more particularly, to an air conditioner for a vehicle which includes a sliding door disposed inside an air-conditioning case to adjust the degree of opening of an air passageway of air discharged to the interior of the vehicle.

Background Art

In general, an air conditioner for a vehicle is an apparatus for cooling or heating the interior of the vehicle by cooling or heating through the process of introducing outdoor air into the interior of the vehicle or circulating indoor air of the vehicle. Such an air conditioner for a vehicle includes an evaporator for cooling the inside of an air-conditioning case; a heater core for heating the inside of the air-conditioning case; and a mode converting door for selectively blowing the air cooled by the evaporator or heated by the heater core toward parts of the interior of the vehicle.

Figure 1:
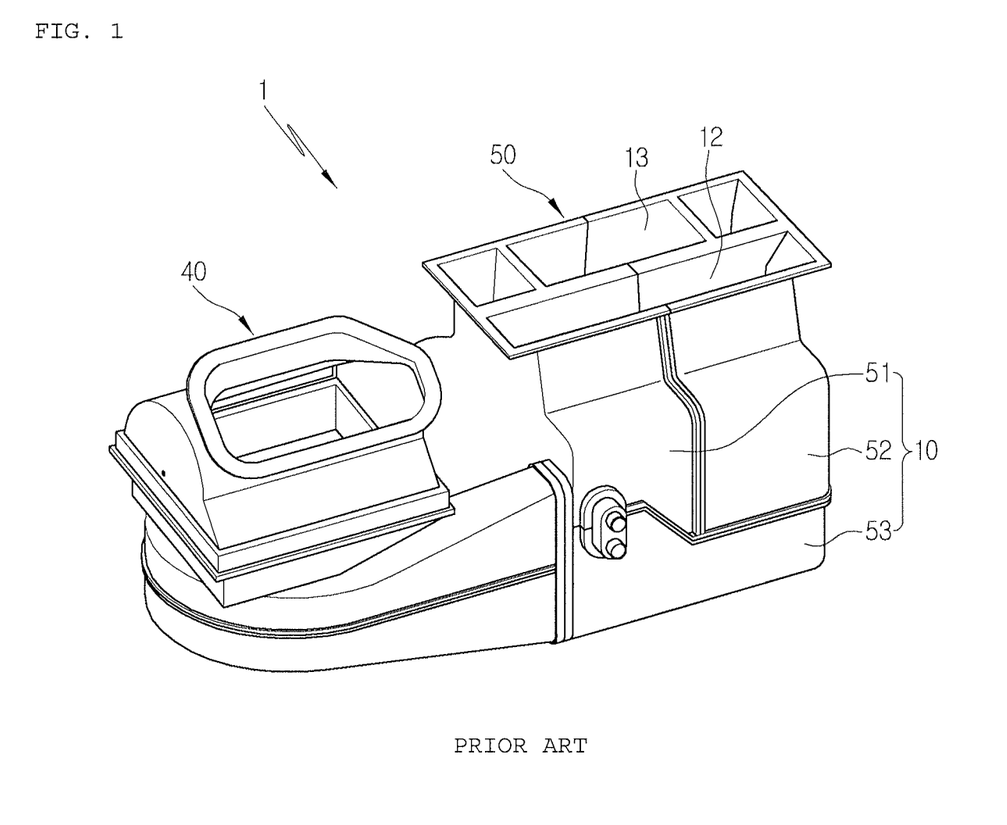
FIG. 1 is a perspective view of a conventional air conditioner for a vehicle.
Figure 2:
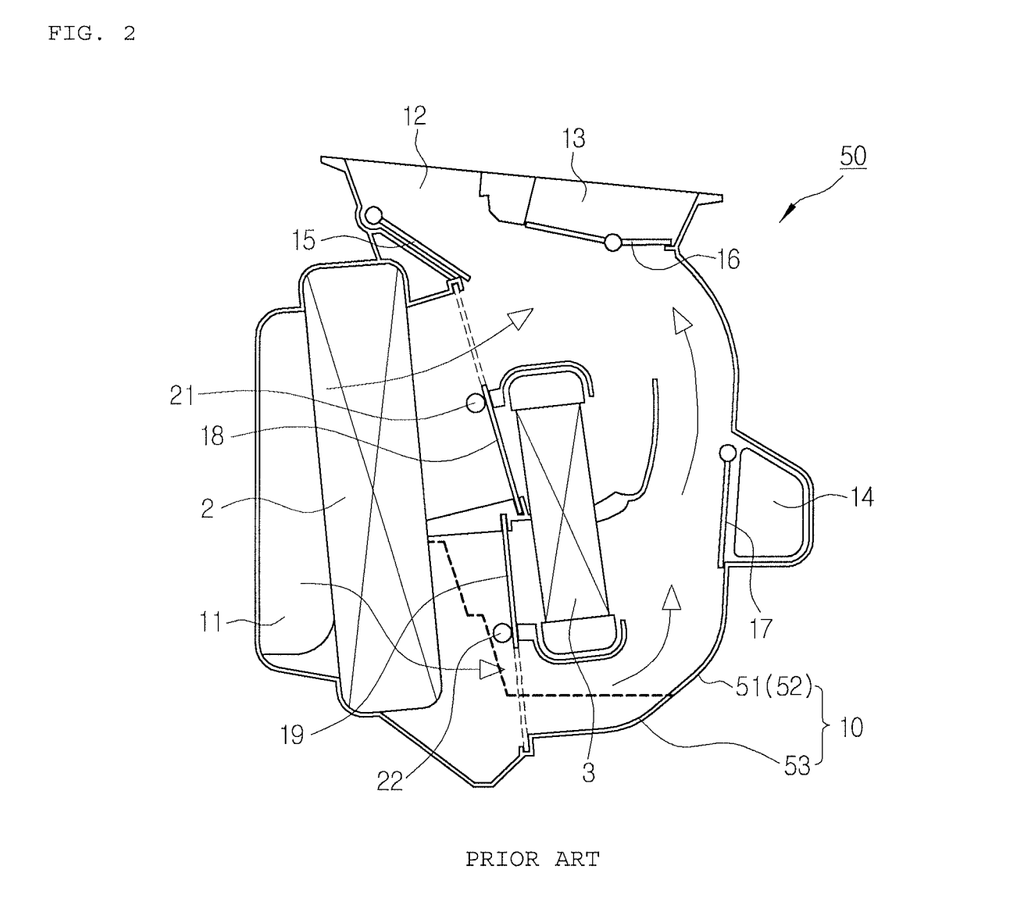
FIG. 2 is a sectional view of the conventional air conditioner for a vehicle.

FIG. 1 is a perspective view showing a conventional air conditioner for a vehicle, and FIG. 2 is a sectional view of the conventional air conditioner for a vehicle.

As shown in FIGS. 1 and 2, the conventional air conditioner 1 for a vehicle includes an air-conditioning unit 50 and a blower unit 40. The blower unit 40 selectively introduces indoor air or outdoor air and blows the indoor air or outdoor air into the air-conditioning unit 50. The blower unit 40 includes a blower motor to adjust air volume. The air-conditioning unit 50 includes an air-conditioning case 10, an air blower, an evaporator 2, a heater core 3, and temp doors 18 and 19.

An air inflow port 11 is formed at an inlet of the air-conditioning case 10, a defrost vent 12, a face vent 13 and a floor vent 14 for adjusting the degree of opening by mode doors 15, 16 and 17 are formed at an outlet of the air-conditioning case 10. The air blower is connected to the air inflow port 11 of the air-conditioning case 10 to blow indoor air or outdoor air.

The evaporator 2 and the heater core 3 are mounted inside the air-conditioning case 10 in an air flow direction in order. The temp doors 18 and 19 are mounted between the evaporator 2 and the heater core 3 in order to adjust temperature of air discharged to the interior of the vehicle by adjusting the degree of opening of a cold air passageway bypassing the heater core 3 and a warm air passageway passing the heater core 3. Cold air and warm air passing through cold air passageway and the warm air passageway are mixed together in a mixing zone, and then, are selectively discharged to the interior of the vehicle through the vents.

The temp door is to selectively adjust the air passing the evaporator toward the heater core or in the direction to bypass the heater core. In FIG. 1, the air conditioner includes two temp doors 18 and 19. The example that the two temp doors are disposed vertically may be applied to a structure to send conditioned air toward a rear seat of the vehicle or a two-layered structure which divides indoor air and outdoor air and introduces into the interior of the vehicle.

The first door 18 is connected to a first shaft 21 and slides by rotation of the first shaft 21, and the second door 19 is connected to a second shaft 22 and slides by rotation of the second shaft 22. Gears are disposed on the first shaft 21 and the second shaft 22, and gear grooves meshed with the gears are formed in the first door 18 and the second door 19.

Figure 3:
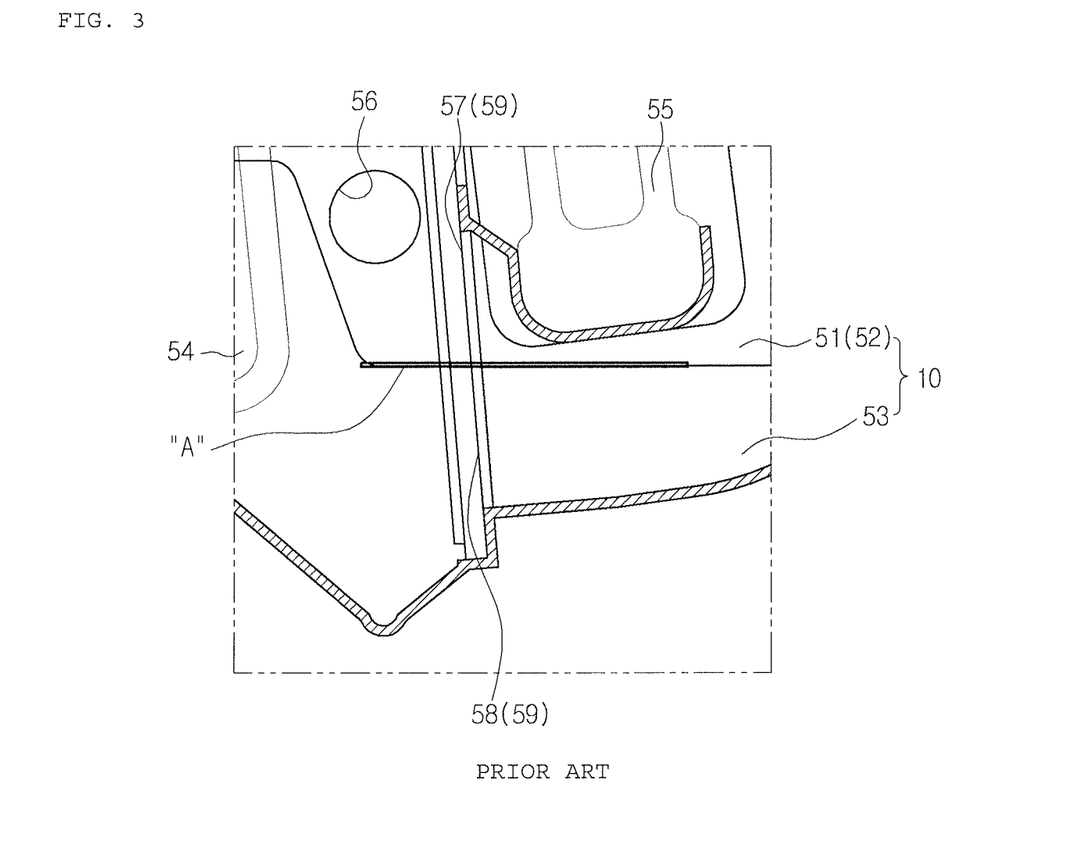
FIG. 3 is an enlarged sectional view of a shape-matching part of upper cases and a lower case.

Upper cases 51 and 52 and a lower case 53 are assembled to form the air-conditioning case 10, and the upper cases 51 and 52 are formed by assembly of a left case 51 and a right case 52. FIG. 3 is an enlarged sectional view of a shape-matching part of the upper cases and the lower case. Referring to FIG. 3, the air-conditioning case 10 includes a guide rail 50 for guiding slide of the door. The reference numeral 54 designates an evaporator seating part, the reference numeral 55 designates a heater core seating part, and the reference numeral 56 designates a groove for assembling the shaft.

The upper cases 51 and 52 have upper guide rails 57 and the lower case 53 has a lower guide rail 58. When the upper cases 51 and 52 and the lower case 53 are assembled with each other, the upper guide rails 57 and the lower guide rail 58 are connected with each other to form one guide rail 59.

As shown in FIG. 3, a section of the shape-matching part between the upper cases 51 and 52 and the lower case 53 having the guide rail 59 is shown by a straight line. Therefore, the conventional air conditioner for a vehicle has a disadvantage in that it is deteriorated in assemblability of the cases and there may be a minute dislocation between the upper cases and the lower case in a right-and-left direction of FIG. 3. Such a minute dislocation or misassembly may obstruct sliding of the temp doors to prevent smooth operation.

SUMMARY OF THE INVENTION

Accordingly, the present invention has been made to solve the above-mentioned problems occurring in the prior arts, and it is an object of the present invention to provide an air conditioner for a vehicle, which makes it possible for an upper case and a lower case to be assembled in correct position without minute misassembly between the upper case and the lower case, thereby making operation of a sliding door smooth.

To accomplish the above object, according to the present invention, there is provided an air conditioner for a vehicle, which includes an air-conditioning case having a plurality of cases and a door disposed inside the air-conditioning case to be able to slide, including: a shape-matching part where the plurality of cases are matched each other in shape; and a guide part crossing the shape-matching part to guide a sliding action of the door, wherein a cross section of the guide part at the shape-matching part is formed to be eccentric.

Moreover, the cross section of the guide part at the shape-matching part has different heights (h1) and (h2) at one side and the other side in a back-and-forth direction of the vehicle.

Furthermore, the cross section of the shape-matching part having at least the guide part is formed to be streamlined.

Additionally, the air-conditioning case includes an upper case and a lower case, and a cross section of the guide part formed at the bottom of the upper case and the top of the lower case has different heights (h1) and (h2) at one side and the other side thereof in the back-and-forth direction of the vehicle.

In addition, the guide part includes a guide rail for inserting the door slidably.

Moreover, the air-conditioning case includes a cooling heat exchanger and a heating heat exchanger therein, and the door is a temp door mounted between the cooling heat exchanger and the heating heat exchanger.

Furthermore, the cross section of the shape-matching part having at least the guide part is formed to be stepped.

Additionally, the cross section of the shape-matching part having at least the guide part is formed to be inclined.

In addition, a cross section of the shape-matching part between the upper case and the lower case is generally streamlined.

Moreover, the guide rail includes an upper guide rail formed on the upper case and a lower guide rail formed on the lower case, and a lower surface of the upper guide rail and an upper surface of the lower guide rail are matched each other in shape.

Furthermore, if the back-and-forth direction of the vehicle is an X-axis direction and a vertical direction is a Y-axis direction, movement of the upper guide rail and the lower guide rail is restricted in the X-axis direction and the Y-axis direction by assembly of the cases.

The air conditioner for a vehicle according to the present invention can improve assembly of cases and make sliding of a door stable and smooth when the cases are assembled with each other through an eccentric structure of a shape-matching part at a guide rail part.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, technical structure of an air conditioner for a vehicle according to exemplary embodiments of the present invention will be described with reference to the accompanying drawings.

Figure 4:
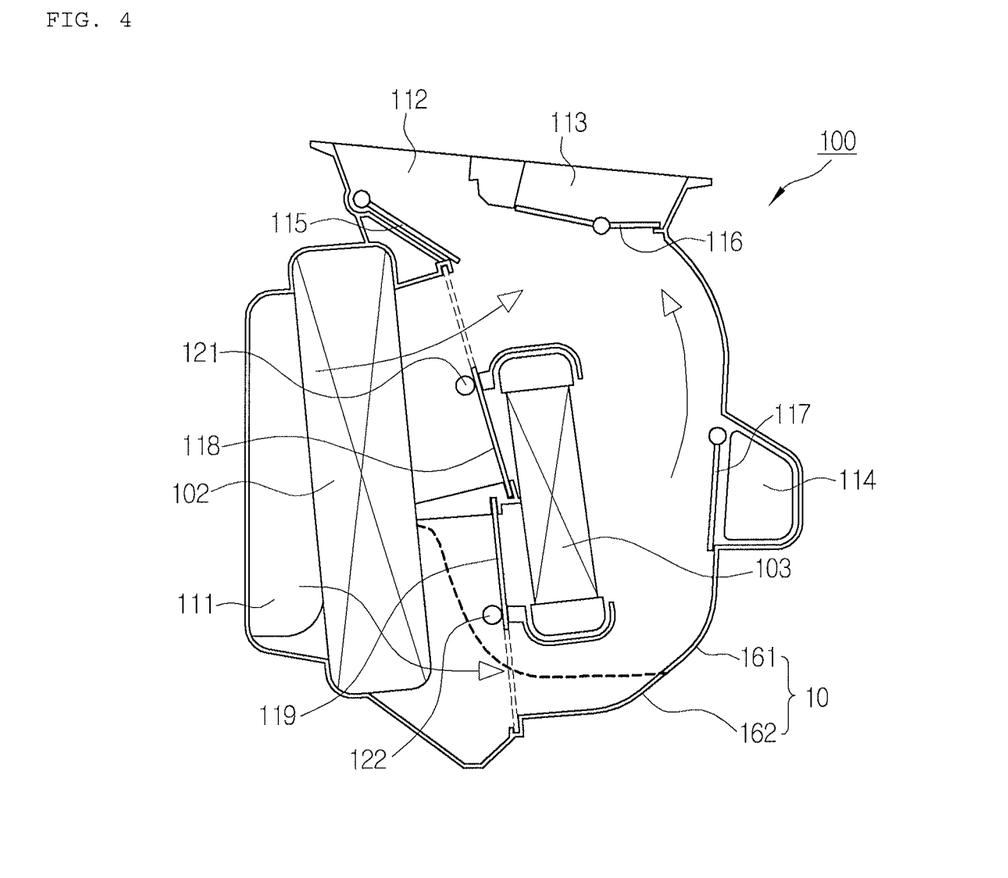
FIG. 4 is a sectional view of an air conditioner for a vehicle according to a preferred embodiment of the present invention.
Figure 5:
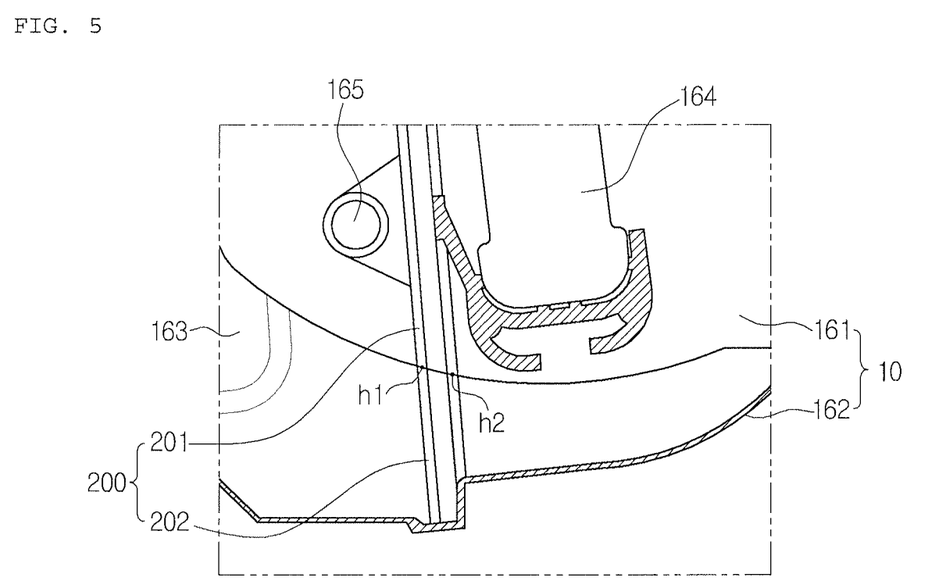
FIG. 5 is an enlarged sectional view showing a shape-matching part of an upper case and a lower case of the air conditioner for a vehicle according to the preferred embodiment of the present invention.
Figure 6:
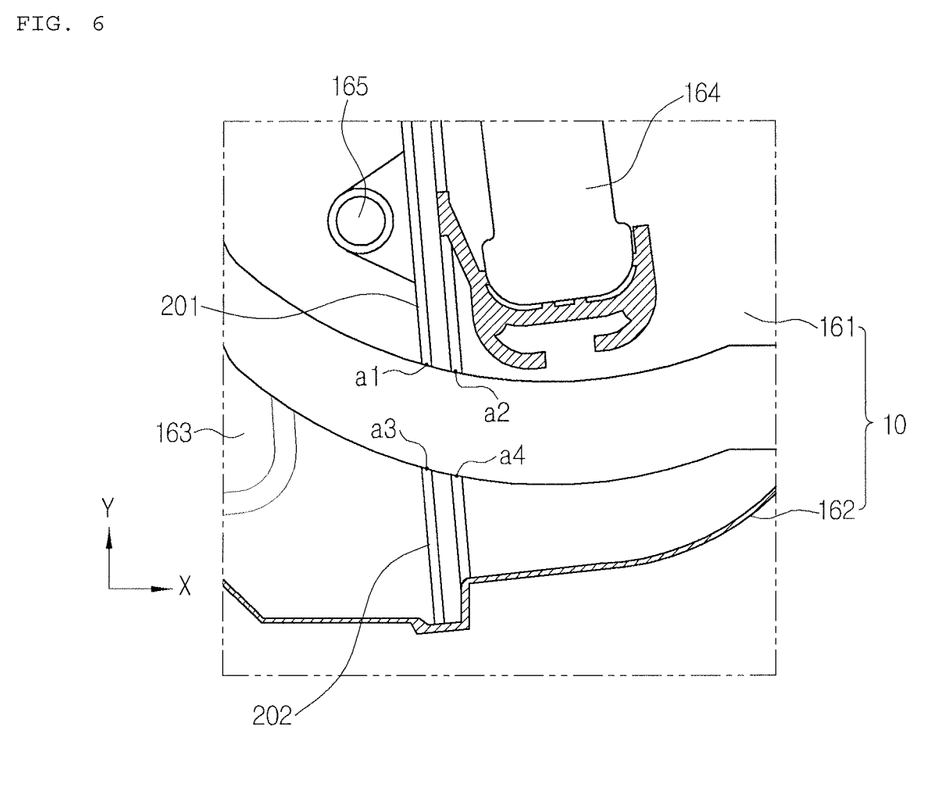
FIG. 6 is an exploded sectional view showing the shape-matching part of the upper case and the lower case of the air conditioner for a vehicle according to the preferred embodiment of the present invention.

FIG. 4 is a sectional view of an air conditioner for a vehicle according to a preferred embodiment of the present invention, FIG. 5 is an enlarged sectional view showing a shape-matching part of an upper case and a lower case of the air conditioner for a vehicle according to the preferred embodiment of the present invention, and FIG. 6 is an exploded sectional view showing the shape-matching part of the upper case and the lower case of the air conditioner for a vehicle according to the preferred embodiment of the present invention As shown in FIGS. 4 to 6, the air conditioner 100 for a vehicle according to the embodiment of the present invention includes an air-conditioning case 110, an air blower, and a first door 118 and a second door 119. A cooling heat exchanger and a heating heat exchanger are disposed inside the air-conditioning case 110 in an air flow direction in order.

The cooling heat exchanger is an evaporator 102 which cools air by exchanging heat between refrigerant of a refrigerant cycle and air, and the heating heat exchanger is a heater core 103 which heats air by exchanging heat between cooling water of a cooling water line and air. The heating heat exchanger may be a heat exchanger using condensation heat of a heat pump system, a PTC heater actuated by electricity, or others.

The first door 118 and the second door 119 are disposed inside the air-conditioning case 110 to adjust the degree of opening of an air passageway by sliding. In this embodiment, the first door 118 and the second door 119 are arranged to be spaced apart from each other vertically, and are temperature-adjusting doors. The temperature-adjusting doors adjust the degree of opening of an air passageway passing through the heater core 103, which is the heating heat exchanger, and an air passageway bypassing the heater core 103.

An air inflow port 111 is formed at an inlet of the air-conditioning case 110, a defrost vent 112, a face vent 113 and a floor vent 114 for adjusting the degree of opening by mode doors 115, 116 and 117 are formed at an outlet of the air-conditioning case 110. The air blower is connected to the air inflow port 111 of the air-conditioning case 110 to blow indoor air or outdoor air. The evaporator 102 and the heater core 103 are mounted inside the air-conditioning case 110 in the air flow direction in order.

The air conditioner for a vehicle includes a first shaft 121 and a second shaft 122. The first shaft 121 is connected to the first door 118 to slide the first door 118 according to rotation thereof. The second shaft 122 is connected to the second door 119 to slide the second door 119 according to rotation thereof. The first door 118 and the second door 119 are formed in a plate shape with a predetermined thickness.

The air conditioner 100 for a vehicle according to the embodiment of the present invention includes the two temp doors, namely, the first door 118 and the second door 119. As described above, the example that the two temp doors are disposed vertically may be applied to a structure to send conditioned air toward rear seats of the vehicle and a two-layered flow structure which divides air into indoor air and outdoor air and introduces into the interior of the vehicle. Hereinafter, the first door 118 and the second door 119 will be called a "door".

The air-conditioning case 110 is formed by a plurality of cases. The door is mounted in the air-conditioning case 110 to be able to slide. The air conditioner for a vehicle has a shape-matching part where a plurality of cases are matched each other in shape. Moreover, the air-conditioning case 110 includes a guide part for guiding sliding of the door. The guide part is formed to cross the shape-matching part. Furthermore, a cross section of the guide part at the shape-matching part is formed to be eccentric.

In more detail, the air-conditioning case 110 is formed by an upper case 161 and a lower case 162. The upper case 161 is formed by assembly of a left case and a right case. The guide part includes a guide rail 200 so that the door (the second door) slides into the air-conditioning case. That is, the guide rail 200 for guiding slide of the door is formed on the inner surface of the air-conditioning case 110. The guide rail 200 has a predetermined width in a back-and-forth direction of the vehicle and extends in a vertical direction. In FIG. 5, the reference numeral 163 designates an evaporator seating part, 164 designates a heater core seating part, and 165 designates a groove for assembling the shaft (the second shaft).

The upper case 161 has an upper guide rail 201 and the lower case 162 has a lower guide rail 202, and the upper guide rail 201 and the lower guide rail 202 are connected with each other when the upper case 161 and the lower case 162 are assembled with each other, so as to form one guide rail 200. The guide rail 202 is formed long in the vertical direction, namely, a Y-axis direction, crossing the shape-matching part of the case. Therefore, a lower surface of the upper guide rail 201 and an upper surface of the lower guide rail 202 are matched each other in shape.

A cross section of the guide rail 200 at the shape-matching part is formed eccentrically. That is, the cross section of the shape-matching part, where the upper guide rail 201 is formed, of the lower surface of the upper guide rail 201 formed on the upper case is formed eccentrically. Additionally, the cross section of the shape-matching part, where the lower guide rail 202 is formed, of the upper surface of the lower guide rail 202 formed on the lower case is formed eccentrically.

Through the above structure, when the upper case 161 and the lower case 162 are assembled with each other, the upper guide rail 201 and the lower guide rail 202 are assembled with each other at the correct position in an X-axis direction and the Y-axis direction without any minute dislocation. That is, due to the eccentric structure of the shape-matching part at the guide rail part 200, the cases can be combined with each other closely in the vertical direction and in the back-and-forth direction since they are restricted in the X-axis direction and in the Y-axis direction in their movement. Therefore, the air conditioner for a vehicle according to the present invention is improved in assemblability and makes sliding of the door stable and smooth.

The cross section of the shape-matching part of the guide part has different heights h1 and h2 at one side and the other side in the back-and-forth direction of the vehicle. In more detail, the cross section of the guide part formed at the bottom of the upper case 161 and the top of the lower case 162 has the different heights h1 and h1 at one side and the other side in the back-and-forth direction of the vehicle. There may be a streamlined structure as the structure to make the shape-matching part eccentric. That is, the cross section of the shape-matching part having at least the guide part is formed to be streamlined.

Referring to FIG. 6, a height of a left point a1 of the cross section of the upper guide rail 201 formed on the bottom of the upper case 161 is higher than that of a right point a2, and an extension line which connects the left point a1 and the right point a2 with each other is formed streamlined. Moreover, a height of a left point a3 of the cross section of the lower guide rail 202 formed on the top of the lower case 162 is higher than that of a right point a4, and an extension line which connects the left point a3 and the right point a4 with each other is formed streamlined. The left point a1 of the upper guide rail 201 corresponds to the left point a3 of the lower guide rail 202, and the right point a2 of the upper guide rail 201 corresponds to the right point a4 of the lower guide rail 202.

In this instance, it is preferable that the cross section of the shape-matching part between the upper case 161 and the lower case 162 be formed streamlined. As described above, because the cross section of the shape-matching part between the upper case 161 and the lower case 162 is formed streamlined, when the upper case 161 and the lower case 162 are assembled with each other, they are accurately assembled without dislocation not only at a portion where the guide rail 200 is located but also at other portions, and parting surfaces of the shape-matching part are assembled with each other accurately so as to enhance an accurate assembly effect at the guide rail part 200.

In the meantime, it is also possible that the cross section of the shape-matching part having the guide part be formed in a stepped shape or an inclined shape. FIGS. 7 to 10 are enlarged sectional views showing just a shape-matching part of an upper case and a lower case according to a modification of the present invention.

Figure 7:
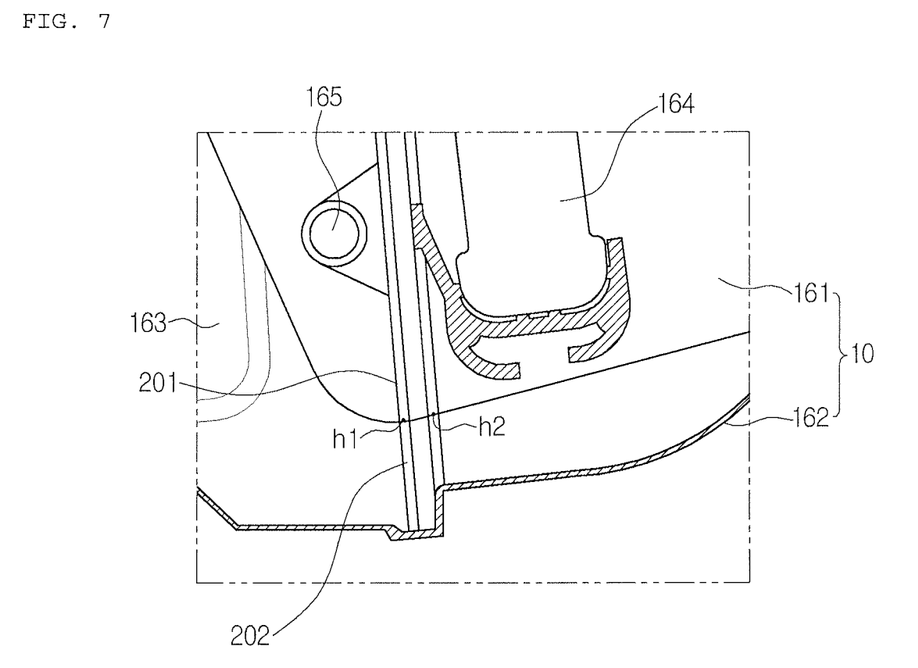
FIGS. 7 to 10 are enlarged sectional views showing just a shape-matching part of an upper case and a lower case according to a modification of the present invention.

Referring to FIG. 7, the cross section of the shape-matching part between the upper case 161 and the lower case 162 is formed streamlined, and a height h1 of one side of the cross section of the guide rail 200 is lower than a height h2 of the other side of the cross section of the guide rail 200 in the back-and-forth direction of the vehicle. Due to such a structure, because the general shape of the shape-matching part is a "U" shape which is concavely streamlined, it makes the upper case and the lower case accurately matched each other in shape in the X-axis direction so as to enhance accurate assembly effect.

Figure 8:
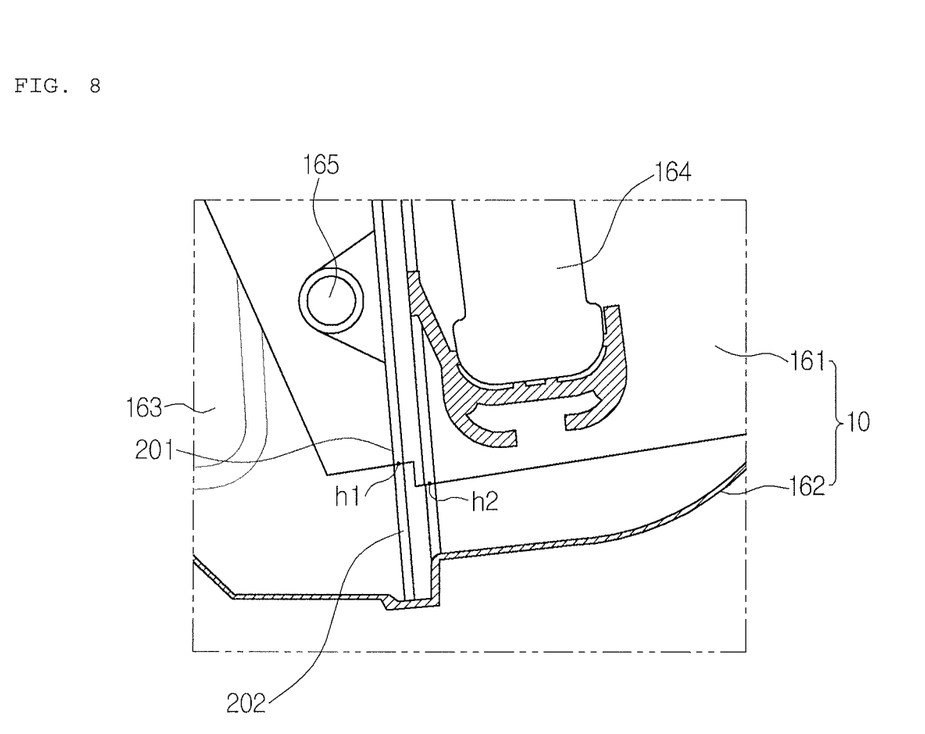
Figure 9:
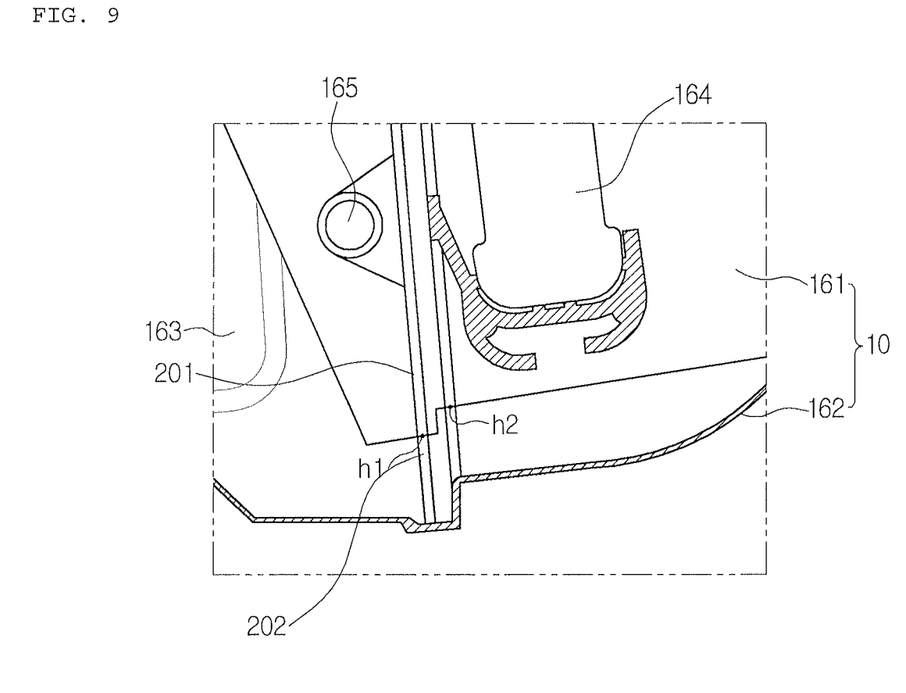

Furthermore, referring to FIG. 8, the cross section of the shape-matching part between the upper case 161 and the lower case 162 may have a stepped shape. In this instance, the height h1 of one side of the cross section of the guide rail 200 in the back-and-forth direction of the vehicle is higher than the height h2 of the other side. Meanwhile, as shown in FIG. 9, the cross section of the shape-matching part between the upper case 161 and the lower case 162 may have a stepped shape, and the height h1 of one side of the cross section of the guide rail 200 in the back-and-forth direction of the vehicle is lower than the height h2 of the other side.

Figure 10:
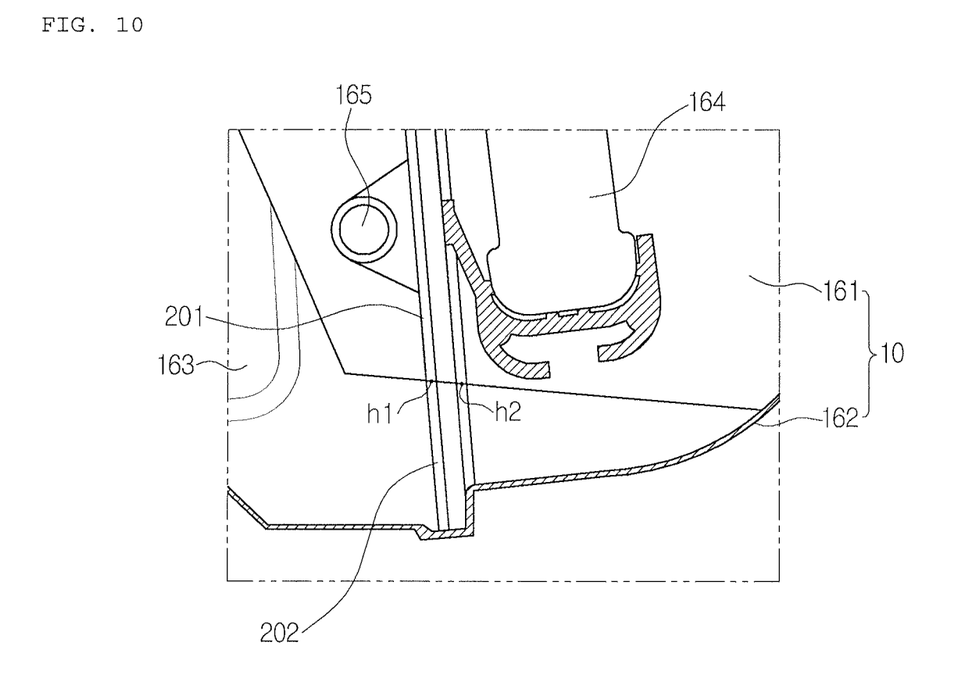

In addition, referring to FIG. 10, the cross section of the shape-matching part between the upper case 161 and the lower case 162 may have an inclined structure.

While the present invention has been particularly shown and described with reference to exemplary embodiments thereof, it will be understood by those of ordinary skill in the art that various modifications and equivalents may be made without deviating from the spirit or scope of the invention. Therefore, it would be understood that the technical and protective scope of the present invention shall be defined by the technical idea as defined by the following claims and the equivalences.

What is claimed is:

1. An air conditioner for a vehicle, which includes an air-conditioning case having a plurality of cases and a door disposed inside the air-conditioning case to be able to slide, comprising: a shape-matching part where the plurality of cases are matched each other in shape; and a guide part crossing the shape-matching part to guide a sliding action of the door, wherein a cross section of the guide part at the shape-matching part is formed to be eccentric, wherein the air-conditioning case includes an upper case and a lower case, and wherein a cross section of the guide part formed at the bottom of the upper case and the top of the lower case has different heights h1 and h2 at one side and the other side thereof in the back-and-forth direction of the vehicle.

2. The air conditioner according to claim 1, wherein the cross section of the guide part at the shape-matching part has different heights (h1) and (h2) at one side and the other side in a back-and-forth direction of the vehicle.

3. The air conditioner according to claim 2, wherein the cross section of the shape-matching part having at least the guide part is formed to be streamlined.

4. The air conditioner according to claim 2, wherein the cross section of the shape-matching part having at least the guide part is formed to be stepped.

5. The air conditioner according to claim 2, wherein the cross section of the shape-matching part having at least the guide part is formed to be inclined.

6. The air conditioner according to claim 1, wherein the guide part includes a guide rail for inserting the door slidably.

7. The air conditioner according to claim 6, wherein the guide rail includes an upper guide rail formed on the upper case and a lower guide rail formed on the lower case, and a lower surface of the upper guide rail and an upper surface of the lower guide rail are matched each other in shape.

8. The air conditioner according to claim 6, wherein if the back-and-forth direction of the vehicle is an X-axis direction and a vertical direction is a Y-axis direction, movement of the upper guide rail and the lower guide rail is restricted in the X-axis direction and the Y-axis direction by assembly of the cases.

9. The air conditioner according to claim 1, wherein the air-conditioning case includes a cooling heat exchanger and a heating heat exchanger therein, and wherein the door is a temp door mounted between the cooling heat exchanger and the heating heat exchanger.

10. The air conditioner according to claim 1, wherein a cross section of the shape-matching part between the upper case and the lower case is generally streamlined.

* * * * *